Jan. 21, 1964  D. M. HAM  3,118,421
TIMED ACTUATOR SYNCHRONOUS SPEED CHECKER
Filed Nov. 23, 1960  2 Sheets-Sheet 1
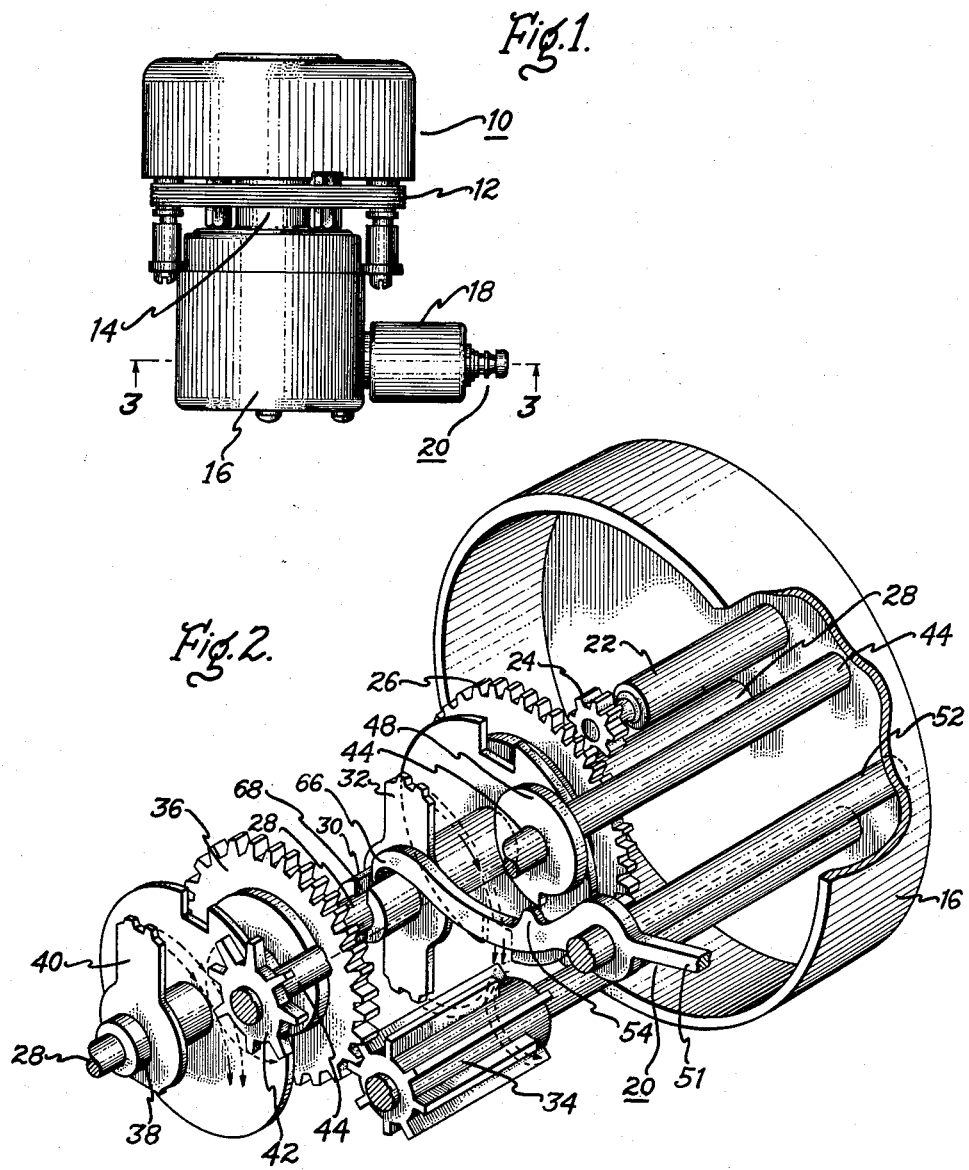
Inventor
Donald M. Ham,
by Francis X. Doyle
His Attorney.

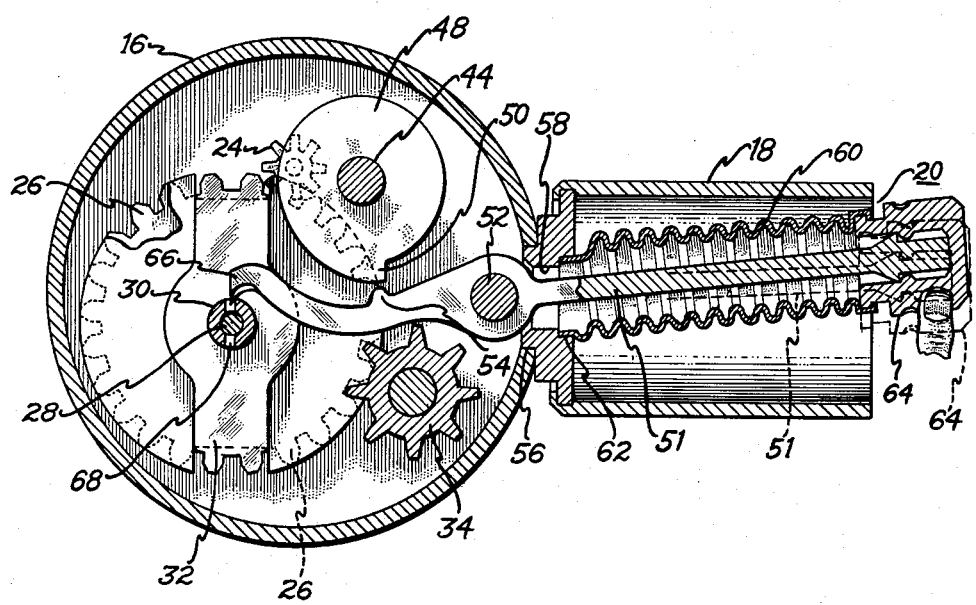

United States Patent Office 3,118,421
Patented Jan. 21, 1964

3,118,421
TIMED ACTUATOR SYNCHRONOUS SPEED CHECKER
Donald M. Ham, Rochester, N.H., assignor to General Electric Company, a corporation of New York
Filed Nov. 23, 1960, Ser. No. 71,271
7 Claims. (Cl. 116—114)

This invention relates to a timed actuator and more particularly to a timed actuator which may be sealed and which is provided with a synchronous speed checker for checking the synchronous operation of the timed actuator.

In application Serial Number 71,266, filed Nov. 23, 1960, now Patent No. 3,075,394 for a "Hermetically-Sealed Timed Actuator," in the name of Edwin B. Judd and Martin W. Hellar, and assigned to the same assignee as the present invention, there is disclosed a hermetically-sealed timed actuator. As is pointed out in that application the maintenance-free life of various mechanisms which are utilized with a timed actuator is generally limited to the maintenance-free life of the timed actuator used therewith. These timed actuators in general fail due to the failure of the synchronous motors which are used in the timed actuator. The causes of these failures are either an oil leak in the motor or the oxidizing of the oil due to air getting into the oil within the motor. In order to overcome these failures of the prior art timed actuators, the hermetically-sealed timed actuator has been provided. However, in providing a hermetically-sealed timed actuator, a new problem has arisen. This problem is found in attempting to check the synchronous speed of the timed actuator. In prior art devices, where the timed actuator is unsealed, a continuously moving gear is generally visible. In those devices it is merely necessary to time a single revolution of the gear in order to determine its synchronous operation. In general, these gears would be rotating at the rate of one revolution per minute. Therefore, it is, in general, possible to time the synchronism of this actuator in one minute. That is, the time for a single rotation of the gear.

However, where the timed actuator is completely sealed to prevent loss or oxidation of the oil, and other timed actuators where gears are not visible, it is necessary to observe the actuating mechanism of the timed actuator and time such actuating mechanism in order to determine whether or not the timed actuator is actually operating in synchronism. In many uses of the timed actuators, the actuating mechanism operates at a preset interval which may be for a prolong period. For example, where such timed actuator is utilized in a demand register for the automatic resetting of the register, the actuating mechanism of the timed actuator will operate at an interval which may be either 15 minutes, 30 minutes or 60 minutes, depending upon the type of demand register. Obviously, to wait for a period which would be a minimum of 15 minutes to determine if the pulses of the timed actuator were occurring at the proper synchronous speed would entail a large use of manpower and therefore would be extremely uneconomical. Thus it is desirable in a sealed timed actuator to provide a checking means which will rapidly and efficiently provide a check of the speed at which the timed actuator is operating so that it can be determined whether or not the desired pulses are occurring at their synchronous speed.

It is therefore an object of this invention to provide a synchronous speed indicator for a timed checker which will provide a rapid check of the speed at which the timed actuator is operating.

It is a further object of this invention to provide a synchronous speed checker for a timed actuator such that the synchronous operation of the timed actuator may be checked without waiting for the operation of the actuating mechanism of the timed actuator.

In carrying out this invention in one form, a timed actuator, which may be sealed to prevent loss or contamination of the lubricating fluid therein, is provided with a synchronous speed checking means, the checking means comprising an actuating mechanism which is actuated to one position at a predetermined time interval. The actuating mechanism is provided with means which co-acts with a timing means within the timed actuator when the actuating mechanism is moved to a second position to provide a check of the synchronous operation of the timing means.

The invention sought to be protected by this application is particularly pointed out and distinctly claimed in the claims appended hereto. However, it is believed that the objects of this invention, as well as other objects and advantages thereof, will be more clearly understood by reference to the following description when taken in connection with the accompanying drawings wherein:

FIGURE 1 is a top view of a hermetically-sealed timed actuator;

FIGURE 2 is an exploded perspective view of the time gearing mechanism of the timed actuator showing the operation of the timing mechanism; and FIGURE 3 is a portion of the hermetically sealed timed actuator showing one form of the synchronous speed checker of this invention, the view being taken substantially on the line 3—3 of FIGURE 1.

Referring now to the drawings in which like numerals are used to indicate like parts throughout, and in particular with reference to FIGURE 1, there is shown a hermetically-sealed timed actuator 10 made in accordance with one form of the invention set forth in the previous noted application, Serial Number 71,266. While the hermetic sealing of the timed actuator is clearly disclosed and claimed in the above noted patent application, and forms no part of this invention, it will be briefly described in order to more clearly set forth the environment in which the novel synchronous speed checker of this invention may be used. As before noted, FIGURE 1 disclosed a hermetically-sealed timed actuator 10 which comprises a stator portion 12, a sealed rotary portion 14, a sealed casing 16 being hermetically sealed to the rotor portion 14, and includes the timed gear mechanism of the actuator. A protective shield 18 sealed to casings 16 is provided to protect the actuating mechanism or device, which is generally indicated at 20, as will be understood by those skilled in this art. The timing actuator 10 operates to cause the actuating mechanism 20 to perform an oscillatory movement at a predetermined timed interval. For example, when the timed actuator 10 is utilized in a demand register, the timed interval for the actuation of the mechanism 20, which provides for the automatic resetting of the register, generally occurs in periods of either 15 minutes, 30 minutes or 60 minutes, depending upon the type of demand register. The desired timed interval of the actuating mechanism or device 20 is obtained through a timed gear mechanism such as, for example, the gearing which is disclosed in FIGURE 2 of the drawing.

Referring now to FIGURE 2 of the drawing, there is shown an exploded perspective view of the timed gearing mechanism which is utilized to obtain the desired timed actuation of the actuating device 20. This timed actuation is obtained from a continuous rotation of a synchronous motor which is comprised of stator 12 and the rotor 14. The casing 16, which is sealed to the rotor 14, only a portion of the casing being shown in FIGURE 2, has the terminal shaft 22 of the motor rotor 14 extending through the end wall. Mounted on the end of the terminal shaft 22 is a spur gear 24, the spur gear 24 meshing with a gear 26. Since the spur gear 24 is continuously rotated by the motor rotor 14, it also continuously rotates the gear 26. The gear 26 is rotatably mounted on a stub shaft 28 by means of a rotatable shaft bearing 30. As will be understood, the gear 26 is fixed to the rotatable shaft bearing 30 so that rotation of gear 26 also rotates the bearing 30. In a similar fashion, a transfer gear 32 is fixed to the rotatable shaft bearing 30 so that transfer gear 32 will rotate with rotation of the gear 26. Mounted within the casing 16 and meshing with transfer gear 32 is the transfer pinion 34. The transfer pinion 34 and transfer gear 32 are designed such that for every revolution of the transfer gear 32 it will engage the transfer pinion 34 twice and cause the pinion 34 to rotate through a half cycle.

As can be seen in FIGURE 2 the transfer pinion 34 is mounted within casing 16 so that it also engages a second gear 36, the second gear 36 being rotatably mounted on the stub shaft 28 by means of a second rotatable shaft bearing 38. Mounted on the shaft bearings 38 with gear 36 is a second transfer gear 40. Thus, the transfer gear 40 will rotate at the same speed as the gear 36. A second transfer pinion 42 is also rotatably mounted in casing 16 so as to engage with transfer gear 40 once during each rotation of the transfer gear. The relation between gear 40 and pinion 42 is such that the pinion 42 will rotate through a 90° portion of its cycle for every rotation of gear 40. As will be well understood, by means of proper selection of the gears 26 and 36, the transfer gears 32 and 40, and the transfer pinions 34 and 42, the transfer pinion 42 may be designed to rotate one complete cycle for any predetermined timed interval. As indicated earlier, in the case of a demand register, one complete cycle of the transfer pinion 42 may be 15 minutes.

The transfer gear 42 is rotatably mounted within casings 16 by means of a stub shaft 44. Pinion 42 is fixed to shaft 44 which is rotatably mounted in casing 16. Similarly, fixedly mounted on the shaft 44 is a cam member 48 provided with a cammed portion 50. Thus, for every rotation of the transfer pinion 42 the cam 48 will make one complete revolution. To provide the desired timed actuation, the actuator mechanism 20, comprising a lever or arm 51 pivotally mounted within casings 16 as, for example, by being pivotally mounted on a stub shaft 52, is provided with a cam follower 54 which is normally maintained in constant contact with cam 48. Thus, for every complete revolution of the cam 48, cam portion 50 will contact cam follower 54 of the lever 51, thus forcing that portion of the lever 51 in a downward direction to cause the opposite end of the lever 51 to move in an upward direction as viewed from FIGURE 2. From the above, it can be seen that through the action of the gearing connected to terminal gear 24 of the synchronous motor, an oscillatory motion of the lever 51 is obtained at a predetermined timed interval.

FIGURE 3 shows the assembled view of the timing mechanism of the timed actuator and shows one form of the synchronous speed checker of this invention. As shown in FIGURE 3, the lever or arm 51 is pivoted about the stub shaft 52 with its outer portion extending through an aperture 56 in casing 16 and an aperture 58 in the shield or guard 18. The outer portion of the lever 51 is surrounded by a flexible member 60 which is sealed to the portion of the guard 18 surrounding aperture 58 as indicated at 62. The outer portion of flexible member 60 is sealed to a cap portion 64 which surrounds and encloses the outer end of lever 51. The actuating mechanism 20 is provided with means which coact with a timing means in the actuator to provide a checker of the synchronous operation of the timed actuator 10. As shown in FIGURE 3 the checking means may comprise a hook portion or member 66 formed on the inner end of the pivoted lever or arm 51. Hook member 66 coacts with a timing means, which in the preferred form shown in FIGURE 3, comprises the slots or indentations 68 formed on the rotatable shaft bearing 30. As can be seen from FIGURE 3, when the outer cap 64 surrounding the end of lever 51 is raised in an upward position as viewed in FIGURE 3, the hook portion 66 of lever 51 will be forced against the rotable bearing 30 and upon rotation of bearing 30 will drop into the slots or indentations 68 when such slot or indentation comes opposite the hook portion 66.

In the normal operation of the actuating mechanism 20, the outer portion of lever 51 including the flexible member 60 and the cap member 64 will provide sufficient weight to bias the outer portion of lever 51 in a downward direction about pivot point 52, thus holding the cam follower 54 in contact with the cam member 48. As cam member 48 rotates and the cam portion 50 of member 48 contacts cam follower 54 of lever 21, the outer cap member 64 is raised to its normal or actuating position shown by the dotted lines in FIGURE 3. In this first position of the mechanism 20, the hook portion 66 of lever 51 does not contact the rotatable shaft bearing 30. However, when pressure is exerted in an upward direction on the cap portion 64 surrounding lever 51, as for example, by finger pressure as indicated in FIGURE 3, the lever is raised to a second position, indicated by the full lines in FIGURE 3. In this position of lever 51, the hook member 66 will engage the rotatable bearing 30 and, as before noted, when one of the slots 68 of bearing 30 is opposite the hook portion 66, the hook portion will slip into the slot 68. Thus, the dropping of the hook end 66 into slot 68 can be felt or observed at the cap member 64 and this will provide a means for checking the speed at which the rotatable bearing 30 is operating.

As shown in FIGURE 3 of the drawing, the rotatable bearing member 30 is provided with two slots or indentations 68, 180° apart. Thus, assuming that the gear 26 is designed to rotate at one revolution every 90 seconds, for a particular application, one of the slots 68 will contact the hook member 66 of lever 51, when the lever is in the second position shown in full lines in FIGURE 3, once every 45 seconds. From this it can be seen that in 45 seconds a check may be made of the synchronous speed of the timed actuator since it is only necessary to check the speed of the rotatable member 30, which rotates at the same speed as the gear 26, to determine whether or not the actuator is operating in synchronism. Of course, it will be understood that as many slots or indentations as may be desired can be made in the rotatable bearing member 30. The actual number of slots utilized will, of course, depend upon the speed of operation of gear 26, and thus rotatable member 30, as will be understood. The desired number of slots will be selected so as to make it easy to check the synchronous speed of the timed actuator in a rapid and efficient manner.

From the above, it will appear obvious that there has been devised a novel means of providing a synchronous speed checker for sealed timed actuator. Of course, it will be understood that there are many changes which could be made in the synchronous checker of the sealed timed actuator. For example, instead of slots, flexible members could be utilized on the rotatable shaft 30. Also, the shaft 30 could be provided with raised portions, rather than slots or indentations, which would provide a similar check. It will also be understood that the use of the invention disclosed herein is not limited to hermetically-sealed timed actuators. Obviously, it may also be used in other timed actuators where there is no rapid, visible means of checking the synchronous operation of the timed actuator.

Therefore, while there has been shown and described, the present preferred embodiment of the invention, as required by the patent statutes, it will be obvious to those

What I claim as new and desire to secure by Letters Patent of the United States is:

1. A synchronous speed checking means for a timed actuator having an actuating mechanism actuated to one position at a predetermined interval of time comprising, checking means on said actuating mechanism, timing means in the timed actuator, said means on said actuating mechanism coacting with said timing means when said actuating mechanism is moved to a second position to thereby provide a check of the synchronous operation of the timed actuator.

2. A synchronous speed checking means for a timed actuator having an actuating mechanism which is actuated to one position at a predetermined timed interval comprising; checking means on said actuating mechanism, timing means in said timed actuator, said checking means comprising a hook portion on the inner end of said actuating mechanism, said hook portion coacting with said timing means when said actuating mechanism is moved to a second position to check the synchronous operation of said timed actuator.

3. A synchronous speed checker for a timed actuator having an actuating mechanism actuated to one position at a predetermined timed interval comprising, a checking means on said actuating mechanism, said checking means being in the form of a hook portion on one end of said actuating mechanism, a timing means within said timed actuator, said timing means being an indentation formed in a rotary member of said timed actuator, said checking means and said timing means coacting when said actuating means is in a second position to check the speed of said rotary member and thereby to provide a check of the synchronous operation of said timed actuator.

4. A synchronous speed checker for a timed actuator having an actuating mechanism actuated to one position at a predetermined timed interval comprising, a checking means on said actuating mechanism, said checking means being a hook portion formed on the inner end of said actuating mechanism, a timing means within said timed actuator, a rotary member in said timed actuator rotating at a predetermined speed, said timing means being formed on said rotary member, said checking means and said timing means coacting when said actuating mechanism is in a second position to check the speed of said rotary member and, thereby, provide a check of the synchronous operation of said timed actuator.

5. A synchronous speed checker for a timed actuator comprising, a pivoted actuating lever movable to a first position at a predetermined timed interval, a checking means on said pivoted lever, said checking means being in the form of a hook portion on the inner end of said pivoted lever, a timing means within said timed actuator, a rotary member in said timed actuator rotating at a predetermined speed, said timing means being formed on said rotary member, said checking means and said timing coacting when said pivoted lever is in a second position to check the speed of said rotary member and thereby, provide a check of the synchronous operation of said timed actuator.

6. A synchronous speed checker for a timed actuator comprising, a pivoted actuating lever movable to a first position at a predetermined time interval, a checking means on said pivoted lever, said checking means being in the form of a hook portion on the inner end of said pivoted lever, a timing means within said timed actuator, a rotary member in said timed actuator rotating at a predetermined speed, said timing means being in the form of slots on said rotary member, said checking means and said timing means coacting when said pivoted lever is in a second position to check the speed of said rotary member and thereby, provide a check of the synchronous operation of said timed actuator.

7. A synchronous speed checker as claimed in claim 6, in which said hook portion contacts said rotary member when said pivoted lever is in said second position and the speed of said rotary member is checked by said hook portion dropping into said slots during rotation of said rotary member.

References Cited in the file of this patent

UNITED STATES PATENTS

| | | |
|---|---|---|
| 619,857 | Becket et al. | Feb. 21, 1899 |
| 2,091,025 | Breer et al. | Aug. 24, 1937 |
| 2,754,505 | Kenyon | July 10, 1956 |
| 2,776,814 | Sparks | Jan. 8, 1957 |
| 2,795,150 | Seidler | June 11, 1957 |
| 2,917,939 | Harris | Dec. 22, 1957 |
| 2,979,885 | Jaccard | Apr. 18, 1961 |

UNITED STATES PATENT OFFICE
CERTIFICATE OF CORRECTION

Patent No. 3,118,421            January 21, 1964

Donald M. Ham

It is hereby certified that error appears in the above numbered patent requiring correction and that the said Letters Patent should read as corrected below.

Column 3, line 71, for "checker" read -- check --; column 6, line 13, after "timing" insert -- means --.

Signed and sealed this 16th day of June 1964.

(SEAL)
Attest:

ERNEST W. SWIDER
Attesting Officer

EDWARD J. BRENNER
Commissioner of Patents